(12) United States Patent
Nagasaka

(10) Patent No.: US 10,303,409 B2
(45) Date of Patent: May 28, 2019

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Hitoshi Nagasaka, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/623,874

(22) Filed: Jun. 15, 2017

(65) Prior Publication Data
US 2017/0364317 A1   Dec. 21, 2017

(30) Foreign Application Priority Data

Jun. 20, 2016   (JP) .................................. 2016-121819

(51) Int. Cl.
| | |
|---|---|
| G06F 3/12 | (2006.01) |
| H04N 1/46 | (2006.01) |
| G06K 15/02 | (2006.01) |
| H04N 1/387 | (2006.01) |

(52) U.S. Cl.
CPC .......... *G06F 3/1254* (2013.01); *G06F 3/1203* (2013.01); *G06F 3/1208* (2013.01); *G06F 3/1247* (2013.01); *G06F 3/1248* (2013.01); *G06F 3/1276* (2013.01); *G06F 3/1284* (2013.01); *H04N 1/3871* (2013.01); *H04N 1/46* (2013.01)

(58) Field of Classification Search
None
See application file for complete search history.

(56) References Cited

U.S. PATENT DOCUMENTS

| | | | | |
|---|---|---|---|---|
| 6,353,441 B1* | 3/2002 | Bou | .................... | G06F 3/04897 345/624 |
| 2002/0039198 A1* | 4/2002 | Nguyen | ................. | G06K 15/02 358/1.18 |
| 2005/0157926 A1* | 7/2005 | Moravec | ............... | G06T 11/001 382/173 |
| 2005/0168778 A1* | 8/2005 | Abe | ....................... | G06F 17/211 358/1.18 |
| 2005/0210372 A1* | 9/2005 | Kraft | ..................... | G06F 17/212 715/205 |
| 2005/0280847 A1* | 12/2005 | Cairns | .................. | H04N 1/6011 358/1.9 |
| 2009/0147288 A1* | 6/2009 | Matsuda | ................ | G06K 15/02 358/1.9 |
| 2010/0007902 A1* | 1/2010 | Kikuchi | ................ | G06F 3/1204 358/1.9 |

(Continued)

FOREIGN PATENT DOCUMENTS

| | | | | |
|---|---|---|---|---|
| JP | 2006-157791 | * | 6/2006 | .............. H04N 1/46 |
| JP | 2006157791 A | | 6/2006 | |

*Primary Examiner* — Beniyam Menberu
(74) *Attorney, Agent, or Firm* — Rossi, Kimms & McDowell LLP

(57) ABSTRACT

Even the case where combination of drawing commands (in particular, generation of a background-combined image) is performed on the application side, a print job that does not cause a difference in hue to arise is generated, which is caused by image processing accompanying printing processing.

11 Claims, 15 Drawing Sheets

(56) References Cited

U.S. PATENT DOCUMENTS

| | | | |
|---|---|---|---|
| 2013/0044336 A1* | 2/2013 | Matsui | G06K 15/1855 358/1.9 |
| 2013/0063736 A1* | 3/2013 | Chiba | G06T 11/60 358/1.6 |
| 2013/0188211 A1* | 7/2013 | Matsushita | G06K 15/1856 358/1.13 |

* cited by examiner

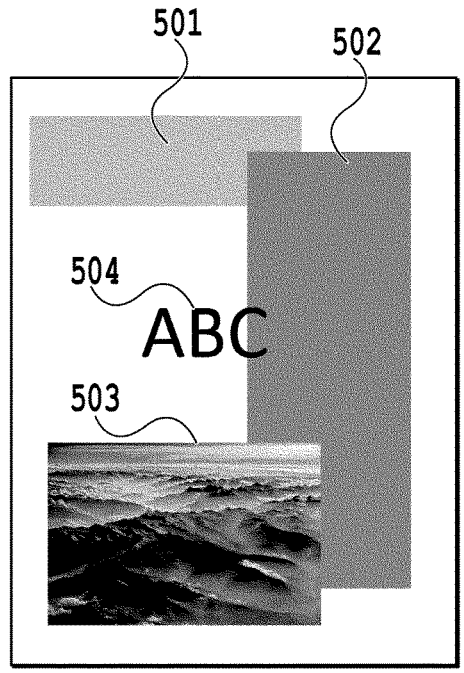
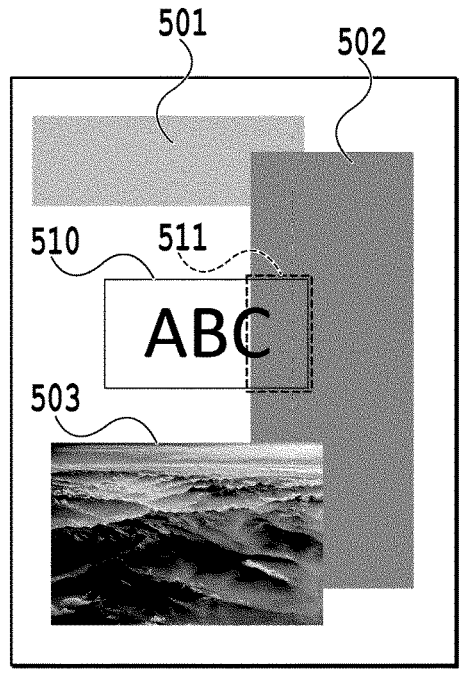
FIG.5A  FIG.5B
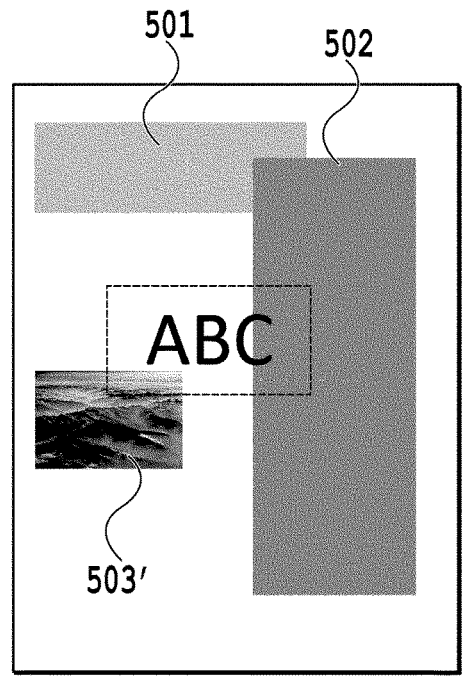
FIG.5C

| GROUP | FROM | TO | COLOR |
|---|---|---|---|
| 0 | 20 | 48 | (0,255,0) |
|  |  |  |  |
|  |  |  |  |

```
<FixedPage Width="1122.56" Height="793.76" xmlns="http://schemas.openxps.org/oxps/v1.0" xml:lang="und">
```
900

<!-- Microsoft XPS Document Converter (MXDC) Generated! Version: 0.3.10240.16384 -->

`<Canvas RenderTransform="1,0,0,1,19.2,19.36">`

`<Path Data="F1 M 0,72.64 L 1083.84,72.64 1083.84,682.24 0,682.24 z"  Fill="#ffffffff" />`

. . .

```
<Path Data="M 492.96,355.68 L 591.36,355.68 591.36,399.84 492.96,399.84 z" attribute="Image">
<Path.Fill>
<ImageBrush ImageSource="../Resources/Images/1.PNG"Viewbox="0,0,205,92"TileMode="None"ViewboxUnits=
"Absolute" ViewportUnits="Absolute" Viewport="492.96,355.68,98.4,44.16" />
```
910    901

`</Path.Fill>`

`</Path>`

`</Canvas>`

`</FixedPage>`

FIG.9A

```
<FixedPage Width="1122.56"Height="793.76"xmlns="http://schemas.openxps.org/oxps/v1.0"xml:lang="und">
```
900

<!-- Microsoft XPS Document Converter (MXDC) Generated! Version: 0.3.10240.16384 -->

`<Canvas RenderTransform="1,0,0,1,19.2,19.36">`

`<Path Data="F1 M 0,72.64 L 1083.84,72.64 1083.84,682.24 0,682.24 z"  Fill="#ffffffff" />`

. . .

```
<Path Data="M 492.96,355.68 L 591.36,355.68 591.36,399.84 492.96,399.84 z" attribute="Image">
<Path.Fill>
<ImageBrush ImageSource="../Resources/Images/1.PNG"Viewbox="0,0,205,92"TileMode="None"ViewboxUnits=
"Absolute" ViewportUnits="Absolute" Viewport="492.96,355.68,98.4,44.16" />
```
910    901

`</Path.Fill>`

`</Path>`

911    902

`<Path Data="F1M 551.84,433.44 L 584,433.44 584,466.24 551.84,466.24 z" attribute="Graphics" Fill="#ffff0000" />`

`</Canvas>`

`</FixedPage>`

FIG.9B

```
<FixedPage Width="1122.56"Height="793.76"xmlns="http://schemas.openxps.org/oxps/v1.0"xml:lang="und">
<!--Microsoft XPS Document Converter (MXDC) Generated! Version:0.3.10240.16384-->
<Canvas RenderTransform="1,0,0,1,19.2,19.36">
<Path Data="F1M0,72.64L1083.84,72.641083.84,682.240,682.24z"Fill="#ffffff"/>
               .
               .                                                          1201
               .
┌─────────────────────────────────────────────────────────────────────────┐
│ <Path Data="M492.96,355.68L591.36,355.68591.36,399.84492.96,399.84z">   │
│ <Path.Fill>                                                             │
│ <ImageBrush ImageSource="../Resources/Images/1.PNG"Viewbox="0,0,205,92"TileMode="None"ViewboxUnits= │
│ "Absolute"ViewportUnits="Absolute"Viewport="492.96,355.68,98.4,44.16"/> │
└─────────────────────────────────────────────────────────────────────────┘
</Path.Fill>
</Path>
</Canvas>
</FixedPage>
```

FIG.12A

```
<FixedPage Width="1122.56"Height="793.76"xmlns="http://schemas.openxps.org/oxps/v1.0"xml:lang="und">
<!--Microsoft XPS Document Converter (MXDC) Generated! Version:0.3.10240.16384-->
<Canvas RenderTransform="1,0,0,1,19.2,19.36">
<PathData="F1M0,72.64L1083.84,72.641083.84,682.240,682.24z"Fill="#ffffff"/>
               .
               .                                                          1201
               .
┌─────────────────────────────────────────────────────────────────────────┐
│ <PathData="M492.96,355.68L591.36,355.68591.36,399.84492.96,399.84z">    │
│ <Path.Fill>                                                             │
│ <ImageBrush ImageSource="../Resources/Images/1.PNG"Viewbox="0,0,205,92"TileMode="None"ViewboxUnits= │
│ "Absolute"ViewportUnits="Absolute"Viewport="492.96,355.68,98.4,44.16"/> │
└─────────────────────────────────────────────────────────────────────────┘
</Path.Fill>
</Path>                                                          1202
┌──────────────────────────────────────────────────────────────────┐
│ <Path Data="F1M551.84,433.44L584,433.44584,466.24551.84,466.24z"Fill="#ffff0000"/> │
└──────────────────────────────────────────────────────────────────┘
</Canvas>
</FixedPage>
```

FIG.12B

```
<FixedPage Width="1122.56" Height="793.76" xmlns="http://schemas.openxps.org/oxps/v1.0" xml:lang="und">
<!-- Microsoft XPS Document Converter (MXDC) Generated! Version: 0.3.10240.16384 -->
<Canvas RenderTransform="1,0,0,1,19.2,19.36">
<Path Data="F1 M 0,72.64 L 1083.84,72.64 1083.84,682.24 0,682.24 z"   Fill="#ffffffff" />
        .
        .
        .
                                                                                        1501
<Path Data="M 492.96,355.68 L 591.36,355.68 591.36,399.84 492.96,399.84 z" attribute="Image">
<Path.Fill>
<ImageBrush ImageSource="../Resources/Images/1.PNG" Viewbox="0,0,205,92" TileMode="None" ViewboxUnits="Absolute" ViewportUnits="Absolute" Viewport="492.96,355.68,98.4,44.16" />
</Path.Fill>
</Path>
</Canvas>
</FixedPage>
```

FIG. 15A

```
<FixedPage Width="1122.56" Height="793.76" xmlns="http://schemas.openxps.org/oxps/v1.0" xml:lang="und">
<!-- Microsoft XPS Document Converter (MXDC) Generated! Version: 0.3.10240.16384 -->
<Canvas RenderTransform="1,0,0,1,19.2,19.36">
<Path Data="F1 M 0,72.64 L 1083.84,72.64 1083.84,682.24 0,682.24 z"   Fill="#ffffffff" />
        .
        .
        .
                                                                                        1502
<Path Data="M 492.96,355.68 L 591.36,355.68 591.36,399.84 492.96,399.84 z" attribute="Graphics">
<Path.Fill>
<ImageBrush ImageSource="../Resources/Images/1.PNG" Viewbox="0,0,205,92" TileMode="None" ViewboxUnits="Absolute" ViewportUnits="Absolute" Viewport="492.96,355.68,98.4,44.16" />
</Path.Fill>
</Path>
</Canvas>
</FixedPage>
```

FIG. 15B

INFORMATION PROCESSING APPARATUS, INFORMATION PROCESSING METHOD, AND STORAGE MEDIUM

BACKGROUND OF THE INVENTION

Field of the Invention

The present invention relates to an image processing technique to convert input drawing data into print data in a format that can be output by a printer.

Description of the Related Art

Conventionally, in a digital copy machine and a printing apparatus, such as a printer, print image quality is improved by performing image processing in accordance with the attribute of each object (OBJ) included in input print data. The attribute includes image, graphics, text, and so on, and a printer driver within an information processing apparatus determines the attribute of a drawing command that is input from an application and generates print data to which attribute information is attached for each object. This print data is data in a format called a PDL (Page Description Language), which can be processed by a printing apparatus (hereinafter, PDL data). The printer driver causes a printing apparatus to perform printing processing by outputting a print job including the PDL data. Further, there is a case where the printer driver combines a plurality of drawing commands having different attributes and converts the plurality of drawing commands into one drawing command of the image attribute (image data thereof is created) at the time of generating PDL data. This is performed to reduce the processing load of the printing apparatus by reducing the data amount in the case where there are a large number of drawing commands or to output a drawn image that cannot be represented by a PDL. Then, in this creation of image data, a drawing bitmap image after combination and an attribute bitmap image representing each attribute of each object before combination are generated. By converting these two kinds of bitmap image into a PDL, it is made possible to perform image processing appropriate for each attribute in the printing apparatus even in the case of an image including a plurality of attributes. As described above, in the case where a plurality of drawing commands is combined within the printer driver, an attribute bitmap image is created, and therefore, it is possible to grasp that a plurality of attributes is included within the drawing bitmap image after the combination.

However, there is a case where the combination of drawing commands is performed in the stage of an application or an OS (Operating System). FIG. 1A to FIG. 1C are diagrams showing an example of the case where a plurality of drawing commands is combined on the application side before the drawing commands are input to the printer driver. FIG. 1A is a drawing-target image displayed on an editing screen of an application, such as PowerPoint (registered trademark). The image in FIG. 1A includes a rectangular graphics OBJ 101 filled in a single color and a character OBJ 102 for which a transparency of 5% is specified. Depending on an application, in the case where a complicated setting, such as partial transparency, is set for the character OBJ, there is an occasion that transparency combination processing is performed for the drawing portion of the character OBJ and the background portion thereof. By this transparency combination processing, an object of an image (hereinafter, background-combined image) in which the character and the background are combined into one is generated. In the case of the image in FIG. 1A, the drawing portion (the rectangular area surrounding "ABC") of the character OBJ 102 and the background portion thereof (the portion of the single color graphics OBJ 101 corresponding to the rectangular area) are combined as a result. An area surrounded by a one-dot chain line rectangle 112 in FIG. 1B indicates the background-combined image generated by the transparency combination processing. As described above, the drawing portion of the character OBJ 102 is combined with the single color graphics OBJ 102, which is the background thereof, and becomes an object of the image attribute. Then, from the application, in place of a text drawing command to specify drawing of the character OBJ 102, an image drawing command to specify drawing of the background-combined image OBJ 112 is delivered to the printer driver.

However, in the printer driver, the attribute of each object is determined based on the kind of drawing command received from the application (or OS). Consequently, in the case where the image drawing command for the background-combined image OBJ 112 is received, the attribute of the object relating to the drawing command is determined to be image. In this case, the area of the single color graphics OBJ 101, which is originally one object, is divided into a graphics attribute area and an image attribute area, i.e., areas of different attributes. As a result of this, for the two areas, which should be the same color, different image processing in accordance with the attribute is performed in the printing apparatus. FIG. 1C shows printing results output from the printing apparatus. While for a drawing area 121 that is not changed and remains the original single color graphics OBJ 101, image processing for the graphics attribute is performed and a printout thereof is produced, for a drawing area 122 that has changed into the background-combined image OBJ 112, image processing for the image attribute is performed and a printout thereof is produced. As a result of this, a difference in hue arises because of the occurrence of the difference in attribute between the drawing areas 121 and 122, which are originally the same color on the editing screen of the application.

Regarding this point, there is a technique to prevent a difference in hue from arising by determining similarity of color data between a reference pixel of interest and the immediately previous adjacent pixel after rendering and by changing the attribute of the reference pixel of interest into the attribute of the immediately previous adjacent pixel in the case where similarity exists (Japanese Patent Laid-Open No. 2006-157791).

However, the technique of Japanese Patent Laid-Open No. 2006-157791 is a technique to change the attribute by comparing pixels adjacent to each other on the drawing image after rendering. That is, it is possible to prevent the problem of the difference in hue from arising by making the attribute the same in the case where pixels of the same color continue and a portion whose attribute is different is detected in the drawing image after rendering. Because of this, in the case where a plurality of different colors exists in one image as described previously (in the case of FIG. 1C, the color is different between the character portion within the background-combined image and the background portion), a portion where the difference in hue cannot be eliminated is left.

SUMMARY OF THE INVENTION

The information processing apparatus according to the present invention is an information processing apparatus including a printer driver that generates a print job for causing a printing apparatus to perform printing, and the printer driver includes: a processing unit configured to perform, in a case where an object relating to a drawing command input from an application is a background-combined image object in which a text object and a background thereof are combined, and the background-combined image object overlaps a graphics object for which a single color is specified, color difference elimination processing to change the drawing command so as to prevent a difference in hue from arising in printing at the overlap portion within the background-combined image object; and a generation unit configured to generate the print job by converting a changed drawing command into a PDL.

Further features of the present invention will become apparent from the following description of exemplary embodiments with reference to the attached drawings.

BRIEF DESCRIPTION OF THE DRAWINGS

FIG. 5A is a diagram showing an example of a printing-target page displayed on a display, FIG. 5B a diagram showing drawing contents that an application delivers to a printer driver, and FIG. 5C is a diagram showing an example of the case where an image OBJ of a natural image also overlaps a background-combined image, in addition to a single color graphics OBJ 502;

FIG. 9A is a diagram showing a drawing command group (intermediate data) before change of a printing-target page and FIG. 9B is a diagram showing a drawing command group (intermediate data) after change;

FIG. 12A is a diagram showing a drawing command group (XPS format) before change of a printing-target page and FIG. 12B is a diagram showing a drawing command group (XPS format) after change;

FIG. 15A is a diagram showing a drawing command group before change of a printing-target page and FIG. 15B is a diagram showing a drawing command group after change.

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

First Embodiment

In a printing system according to the present embodiment, in an information processing apparatus, a printer driver analyzes a drawing command input from an application and generates a print job after changing the attribute so as to prevent a difference in hue from arising. Then, the print job is sent to a printing apparatus and printing processing is performed. In the following, detailed explanation is given.

Figure 1A:
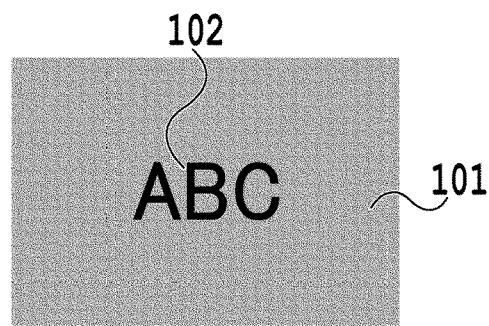
FIG. 1A to FIG. 1C are diagrams showing an example of the case where a plurality of drawing commands is combined on the application side.
Figure 1B:
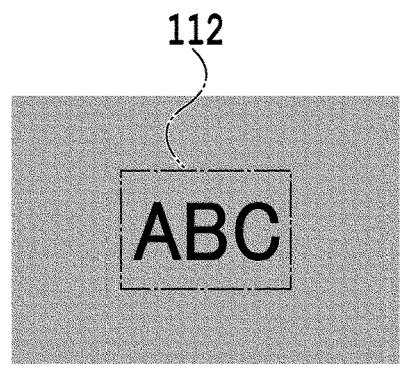
Figure 1C:
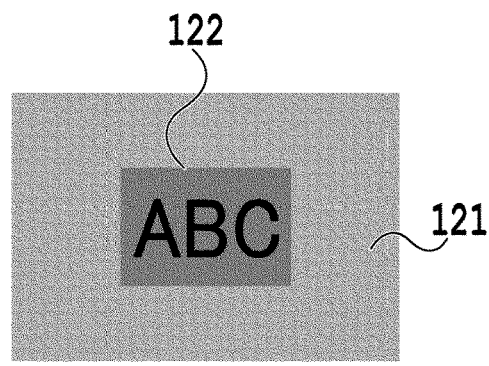
Figure 2:
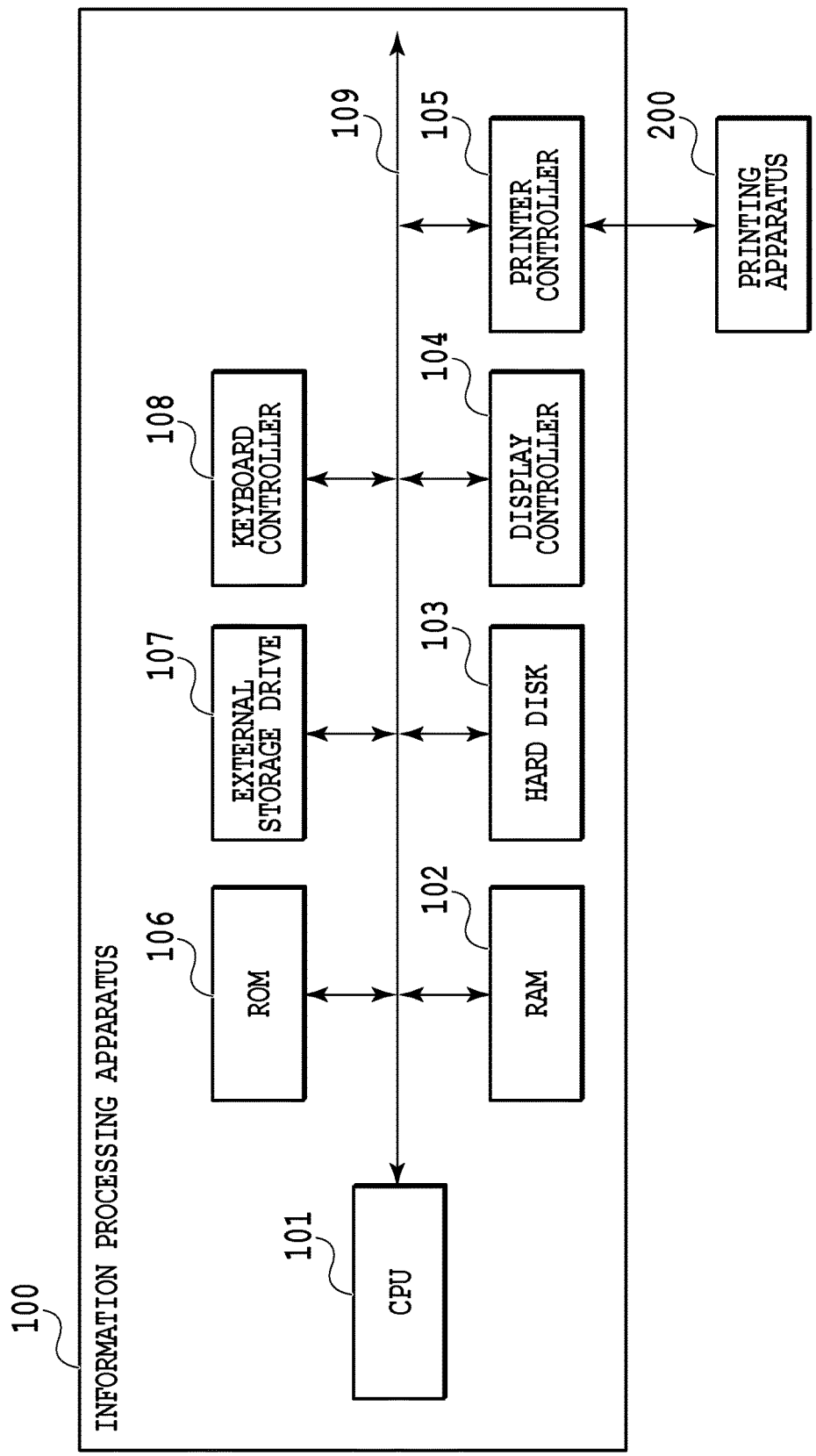
FIG. 2 is a block diagram showing an example of a hardware configuration of an information processing apparatus.

FIG. 2 is a block diagram showing an example of a hardware configuration of an information processing apparatus. The configuration shown in FIG. 2 is an example and an information processing apparatus 100 may be a stand-alone apparatus or a system including a plurality of apparatuses connected via a network, such as a LAN and a WAN. The information processing apparatus 100 implements various kinds of processing by a CPU 101 executing processing programs stored in a ROM 106 and a hard disk 103 and centralizedly controls each unit connected to a system bus 109. Further, the CPU 101 performs various kinds of processing, such as processing to open a window registered in advance, based on a command specified by a mouse cursor or the like. For example, at the time of a user giving instructions to perform printing, the user opens a window for print settings and performs various settings for a printer driver (not shown schematically), to be described later. A RAM 102 functions as a main memory, a work area, and so on, of the CPU 101. In the hard disk 103, an OS, boot programs, various applications, font data, user files, edited files, and so on, are stored. A printer driver is also saved in the hard disk 103. A display controller 104 controls the display of a display, not shown schematically. A printer controller 105 is connected to a printing apparatus 200 via a predetermined bidirectional interface (not shown schematically) and in charge of control of communication with the printing apparatus 200. The CPU 101 enables WYSIWYG on the display by performing development (rasterize) processing of outline fonts onto, for example, a display information RAM set on the RAM 102. An external storage drive 107 controls access to a storage medium, such as a CD and a DVD. A keyboard controller 108 controls a key input from a keyboard and a pointing device.

Figure 3:
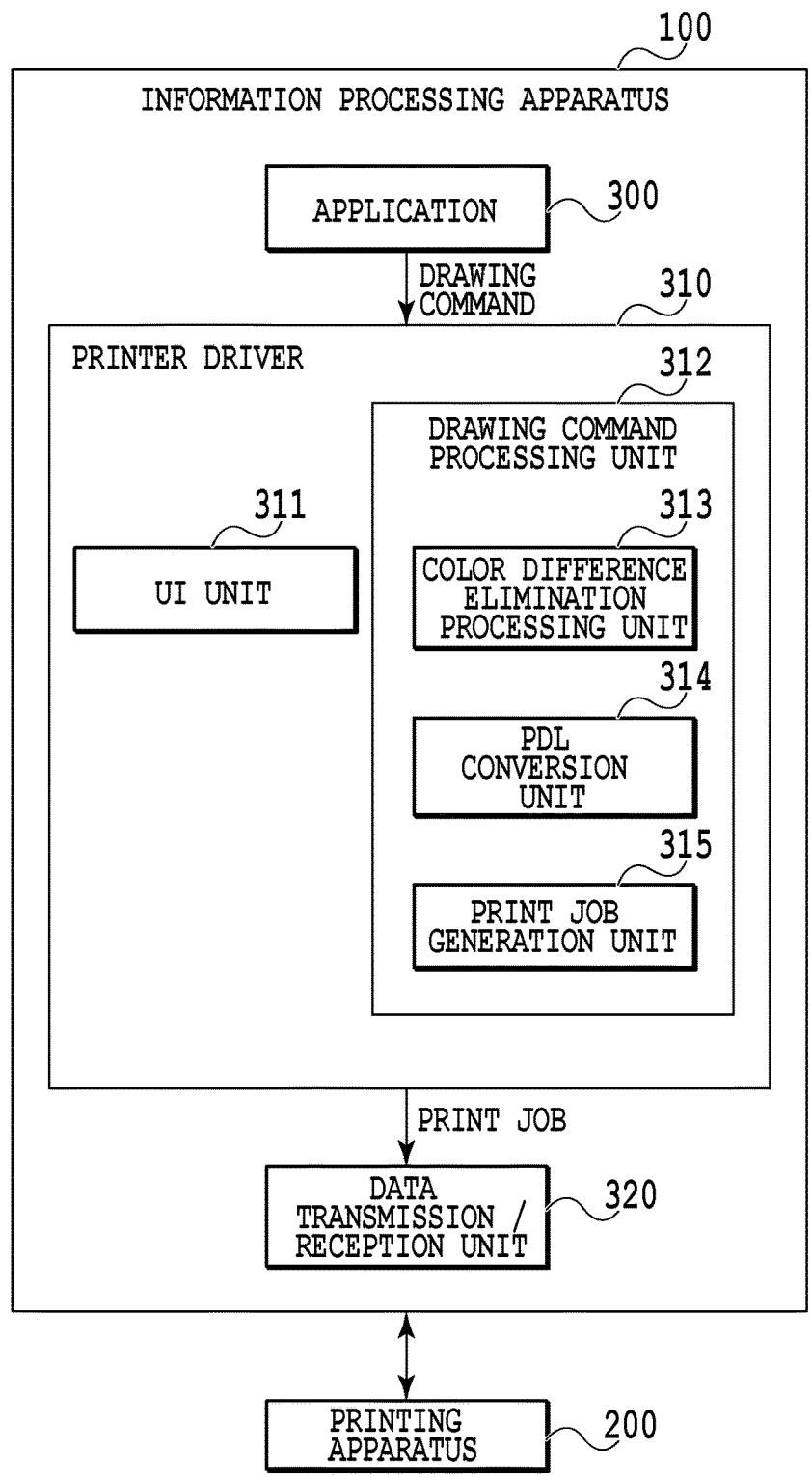
FIG. 3 is a block diagram showing an example of a software configuration of the information processing apparatus.

FIG. 3 is a block diagram showing an example of a software configuration of the information processing apparatus 100. The information processing apparatus 100 is connected with the printing apparatus 200, to be described later, via the printer controller 105 described previously. In the information processing apparatus 100, an operating system (hereinafter, OS), not shown schematically, is installed. As the OS, mentions is made of, for example, Windows (registered trademark). An application 300 is software that generates various documents and the like and for example, PowerPoint (registered trademark) described previously corresponds to this, and the application 300 runs on the OS.

A printer driver 310 is software that generates a print job for causing the printing apparatus 200 to perform printing processing. The printer driver 310 generates a print job by converting a drawing command in the format, for example, such as XPS and GDI, received from the application 300 into a PDL, which is a data format that the printing apparatus 200 can process. The print job includes information necessary at the time of printing processing (print setting information), such as the sheet size, the number of copies, the layout, such as N-up printing and both-side printing, and the color/monochrome setting, in addition to the printing-target image data described in the PDL. The printer driver 310 includes a UI unit 311 and a drawing command processing unit 312. The UI unit 311 displays a UI screen for a user to perform various settings at the time of printing processing and to give instructions to start printing, and provides a function relating to the user interface, such as a function to process information input on the UI screen. The drawing command processing unit 312 generates the above-described print job based on a drawing command received from the application 300. This drawing command processing unit 312 includes a color difference elimination processing unit 313, a PDL conversion unit 314, and a print job generation unit 315. In the following, each unit making up the drawing command processing unit 312 is explained.

The color difference elimination processing unit 313 analyzes a drawing command input from the application 300 and converts the drawing command into intermediate data, and specifies a portion expected to cause a difference in hue to arise and performs processing to change the intermediate data so as to prevent a difference in hue from arising at the time of printing. The PDL conversion unit 314 converts the intermediate data changed in accordance with the necessity into a PDL and generates PDL data that the printing apparatus 200 can process. As the PDL, mention is made of, for example, a PS (made by Adobe Systems), a PCL (made by HP Company), and so on, but not limited in particular. The print job generation unit 315 generates a print job including generated PDL data and print setting information. The generated print job is sent to the printing apparatus 200 by a data transmission/reception unit 320, which is one of the functions of the OS. Then, the printing apparatus 200 performs printing processing in accordance with the print job received from the information processing apparatus 100. Specifically, the printing apparatus 200 forms an image on a printing medium, such as paper, after performing necessary processing, such as rendering and quantization, for the PDL data included in the print job. In the present embodiment, the configuration is such that the intermediate data changed in accordance with the necessity is converted into a PDL after converting the drawing command input from the application 300 into the intermediate data, but the configuration is not limited to this. For example, a configuration in which the input drawing command is converted into a PDL by performing change processing directly for the input drawing command may be accepted.

Figure 4:
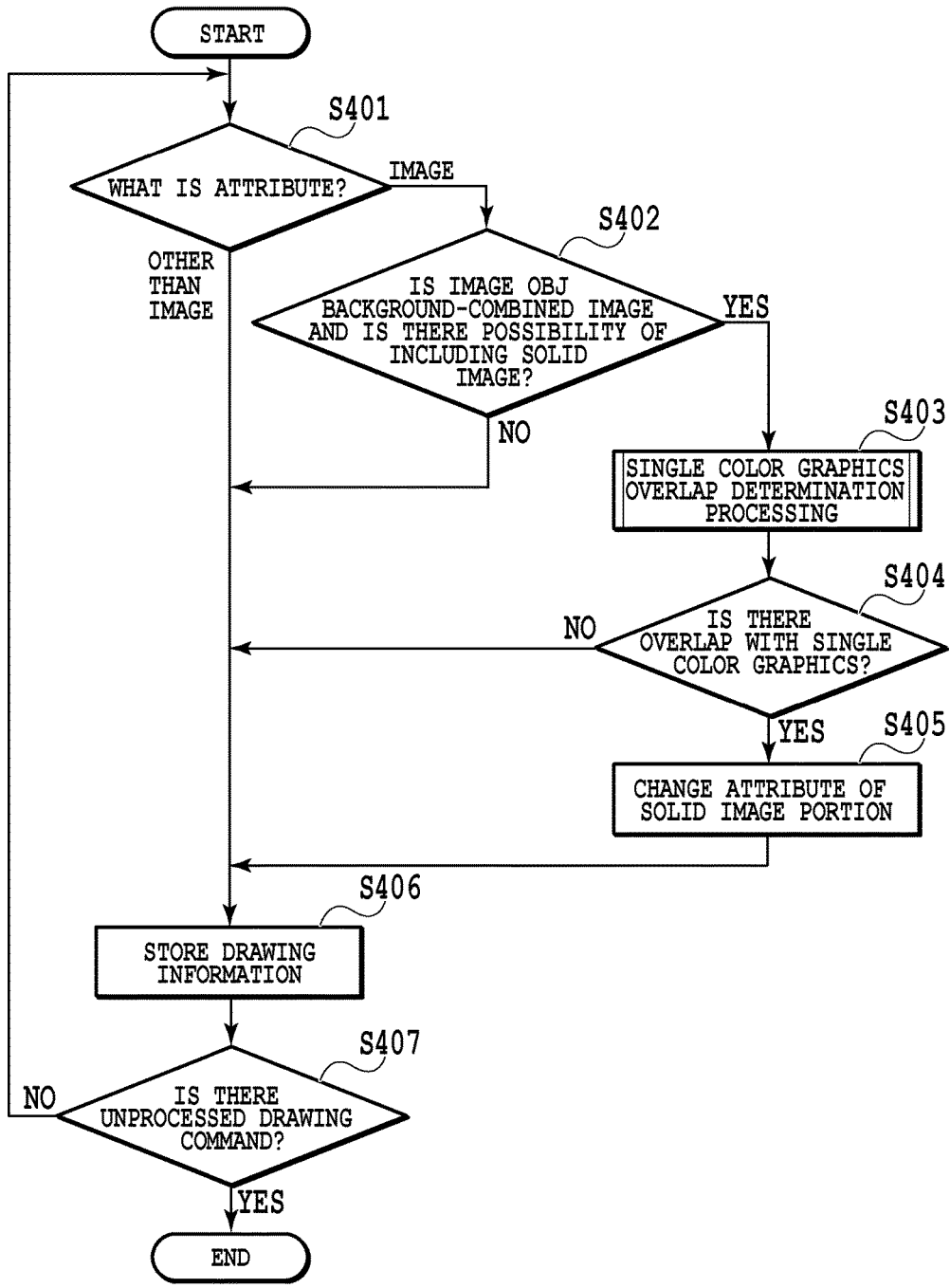
FIG. 4 is a flowchart showing a flow of change processing of a drawing command according to a first embodiment.

Following the above, change processing of a drawing command (intermediate data), which is a feature of the present embodiment, is explained in detail. FIG. 4 is a flowchart showing a flow of the change processing of a drawing command according to the present embodiment. In the case where the drawing command of a printing-target image is delivered in units of pages from the application 300 to the printer driver 310, the processing to convert the drawing command into intermediate data is performed first as described above, and then the following series of processing is started. However, in the explanation of the flow in FIG. 4, the drawing command after being converted into intermediate data is also called the "drawing command" as a matter of convenience. FIG. 5A shows an example of a printing-target page created by the application 300, which is displayed on the display of the information processing apparatus 100. On the printing-target page in FIG. 5A, three kinds of object (OBJ), i.e., a graphics, text, and an image, exist. Reference symbol 501 indicates a graphics OBJ in the form of a horizontally elongated single color rectangle and reference symbol 502 indicates a graphics OBJ in the form of a vertically elongated single color rectangle and here, both colors are assumed to be (R, G, B)=(255, 0, 0), (0, 255, 0), respectively. Reference symbol 503 indicates an image OBJ of a landscape (natural image). Reference symbol 504 indicates a text OBJ including three alphabetic characters "ABC", for which a transparency of 5% is specified. Then, FIG. 5B is a diagram showing drawing contents that the application 300 delivers to the printer driver 310. These OBJs are delivered to the printer driver 310 by drawing commands in accordance with the original attributes, such as that the two graphics OBJs 501 and 502 in the form of a single color rectangle are delivered by a graphics drawing command and that the image OBJ 503 of a natural image is delivered by an image drawing command. However, as to the text OBJ 504 including the three alphabetic characters, as a result that the text OBJ 504 has changed into a background-combined image OBJ 510 by the transparency combination processing described previously, an image drawing command is delivered to the printer driver 310 in place of a text drawing command. At this time, for an area 511 surrounded by the broken line within the background-combined image OBJ 510, the same color as that of the graphics OBJ 502 in the form of a single color rectangle, i.e., (0, 255, 0) is specified. However, its attribute has changed from graphics into image, and therefore, the handling is different depending on the attribute in the image processing at the time of printing and a difference in hue arises at the boundary portion between the broken line area 511 and the original graphics OBJ 502. The contents of the color difference elimination processing in the present embodiment to solve the problem such as this are explained along the flow in FIG. 4 by taking the above-described FIG. 5A and FIG. 5B as an example.

At step 401, the attribute of the input drawing command is determined (attribute determination processing). At this time, the drawing commands are processed in the order from the drawing command that is first in the drawing order. In the case where the results of the determination indicate the image attribute, the processing advances to step 402 and in the case where the results of the determination indicate an attribute other than image, the processing advances to step 406. In the case of the page shown in FIG. 5A, the OBJs are drawn in the order of the graphics OBJ 501, the graphics OBJ 502, the image OBJ 503, and the background-combined image OBJ 510. Consequently, for the drawing command of the single color graphics OBJ 501, the attribute determination processing is performed first and the results of the determination indicate graphics, and therefore, the processing advances to step 406. As a matter of convenience for explanation, step 406 and step 407 are explained first.

Figure 6:
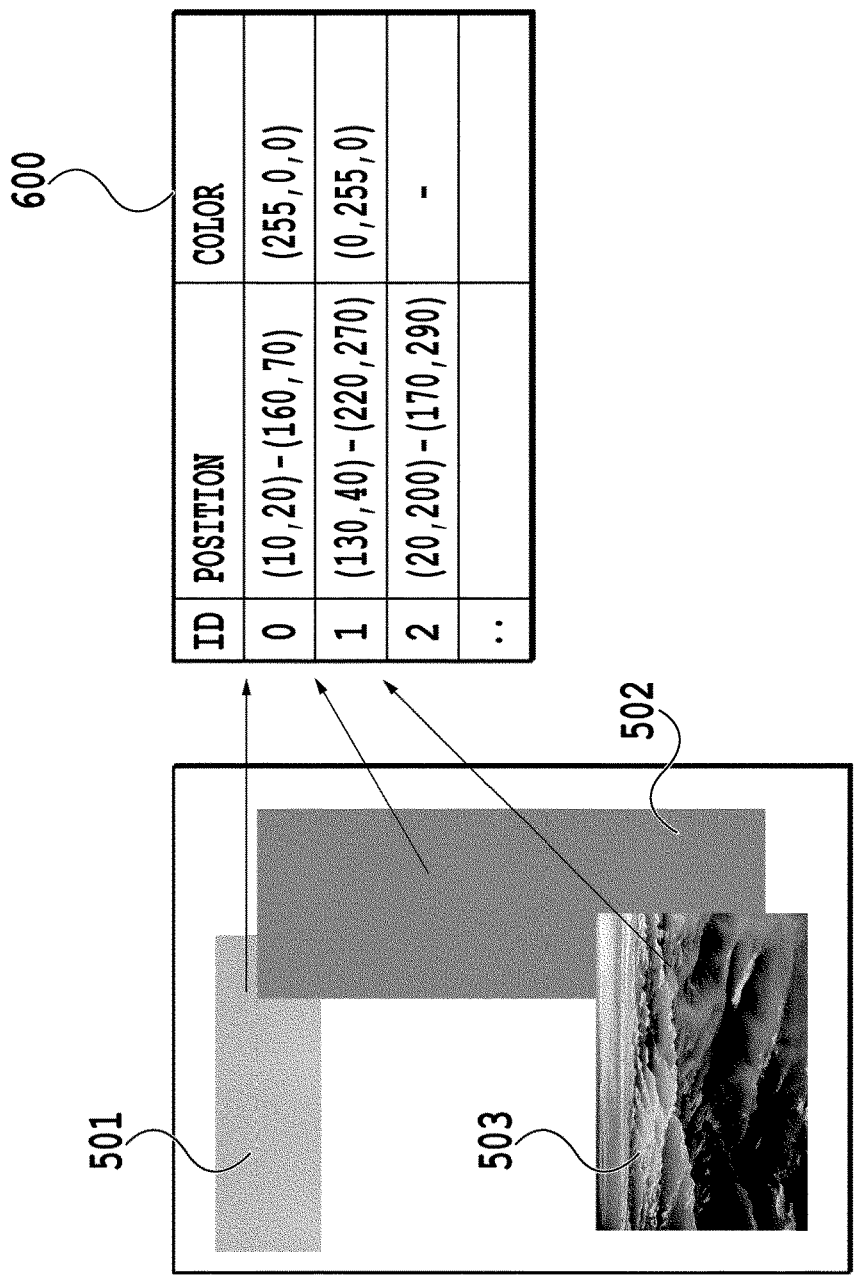
FIG. 6 is a diagram showing an example of a drawing information table.

At step 406, the drawing information on the processing-target drawing command is stored in a table. FIG. 6 is a diagram showing an example of a drawing information table. In a drawing information table 600, information is stored in the order of drawing, such as the position, the size (circumscribed rectangle), and the color in the case where the attribute of the drawing command is graphics and a single color is specified within a page of an object to be drawn by the drawing command. In the table 600 shown in FIG. 6, ID: 0 indicates drawing information on the graphics OBJ 501 and a single color is specified, and therefore, as color information, (R, G, B)=(255, 0, 0) is stored. Then, upon the completion of storage of the drawing information, the processing advances to step 407 and whether there is an unprocessed drawing command is determined. In the case where there is an unprocessed drawing command, the processing returns to step 401 and the processing for the next drawing command is continued in accordance with the drawing order. In the example in FIG. 5A and FIG. 5B, the same processing as that performed for the graphics OBJ 501 is also performed for the graphics OBJ 502 and the drawing information of ID: 1 is stored in the table 600. Then, in the case where the attribute is determined to be image by the attribute determination processing (step 401) of the drawing command of the image OBJ 503 in the routine for the third time, the processing advances to step 402 as a result.

Figures 7A, 7B:
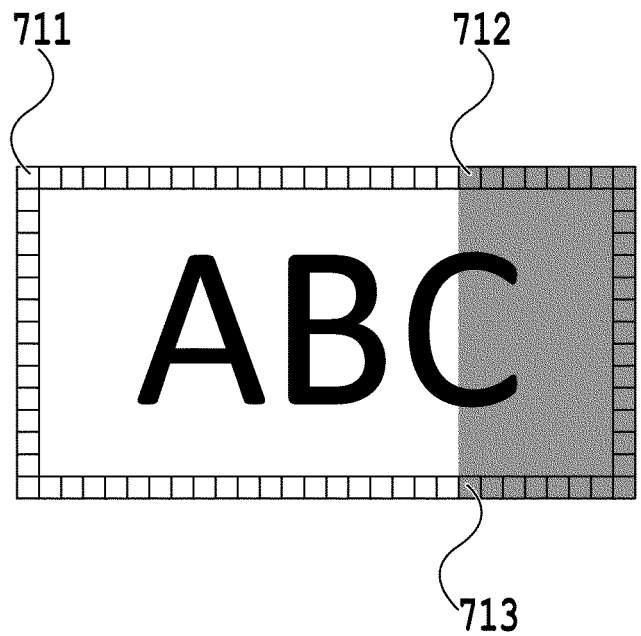
FIG. 7A is a diagram showing pixels making up a boundary of the background-combined image OBJ and FIG. 7B is a diagram showing a table that stores information on a pixel series in which the same color continues.

At step 402, whether the image OBJ corresponding to the image drawing command is the background-combined image and there is a possibility of including a solid image is determined. Here, the solid image refers to the portion where part of the graphics OBJ for which a single color is specified has changed into the image attribute by the transparency combination processing. In the determination processing at this step, whether a color other than white continues in a predetermined number or more in each pixel (each pixel located at the boundary position with the outside of the image OBJ) making up the boundary of the image OBJ is determined. Explanation is given with reference to FIG. 7A and FIG. 7B. FIG. 7A corresponds to the background-combined image OBJ 510 and each of a plurality of rectangles located on the outer circumference thereof indicates a pixel making up the boundary. However, as a matter of convenience for explanation, the resolution is lower than the actual image resolution. In the order from a pixel 711 located at top-left, the color of each pixel is checked and in the case where pixels of a color not white (colored pixels) continue in a predetermined number or more, it is determined that there is a possibility that a solid image is included. For example, in the case where the image resolution of a printing-target page is 600 dpi, on a condition that twenty-four, corresponding to 1 mm, or more colored pixels of the same color continue, it is determined that there is a possibility of including a solid image. In the example in FIG. 7A, with the pixel 711 as a reference, from a 20th pixel 712 to 48th pixel 713, pixels of (R, G, B)=(0, 255, 0) are put side by side continuously, and therefore, it is determined that a solid image may be included in this portion. Further, there may be a case where a plurality of portions where the same color continues exists, and therefore, a pixel series in which the same color continues is grasped as one group and for example, in such a table as shown in FIG. 7B, the group is held along with its color information. In the case where the results of the determination indicate that the image OBJ corresponding to the image drawing command is the background-combined image OBJ having the possibility of including a solid image, the processing advances to step 403. On the other hand, in the other cases, the processing advances to step 406 described above and the drawing information thereon is stored.

At step 403, processing to determine whether a graphics OBJ for which a single color is specified overlaps the background-combined image OBJ having the possibility of including a solid image is performed (single color graphics overlap determination processing). Details of the single color graphics overlap determination processing will be described later. At step 404 that follows, the processing is branched in accordance with the results of the single color graphics overlap determination processing. That is, in the case where the results of the determination indicate that there is an overlap with the single color graphics OBJ, the processing advances to step 405 and in the case where the results of the determination indicate that there is no overlap with the single color graphics OBJ, the processing advances to step 406 described above.

Figure 8A:
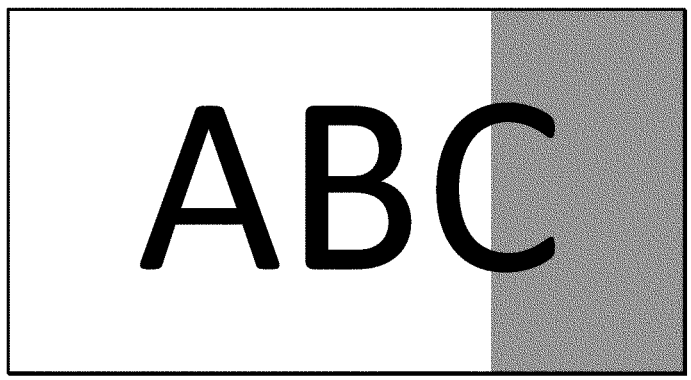
FIG. 8A is an enlarged diagram of the background-combined image OBJ and FIG. 8B is a diagram showing a portion corresponding to a solid image by graphics drawing by a path point series.
Figure 8B:
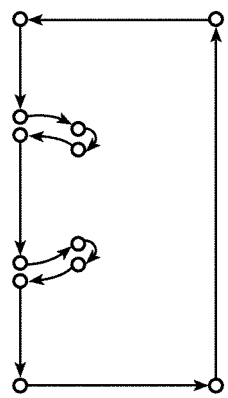
Figure 10:
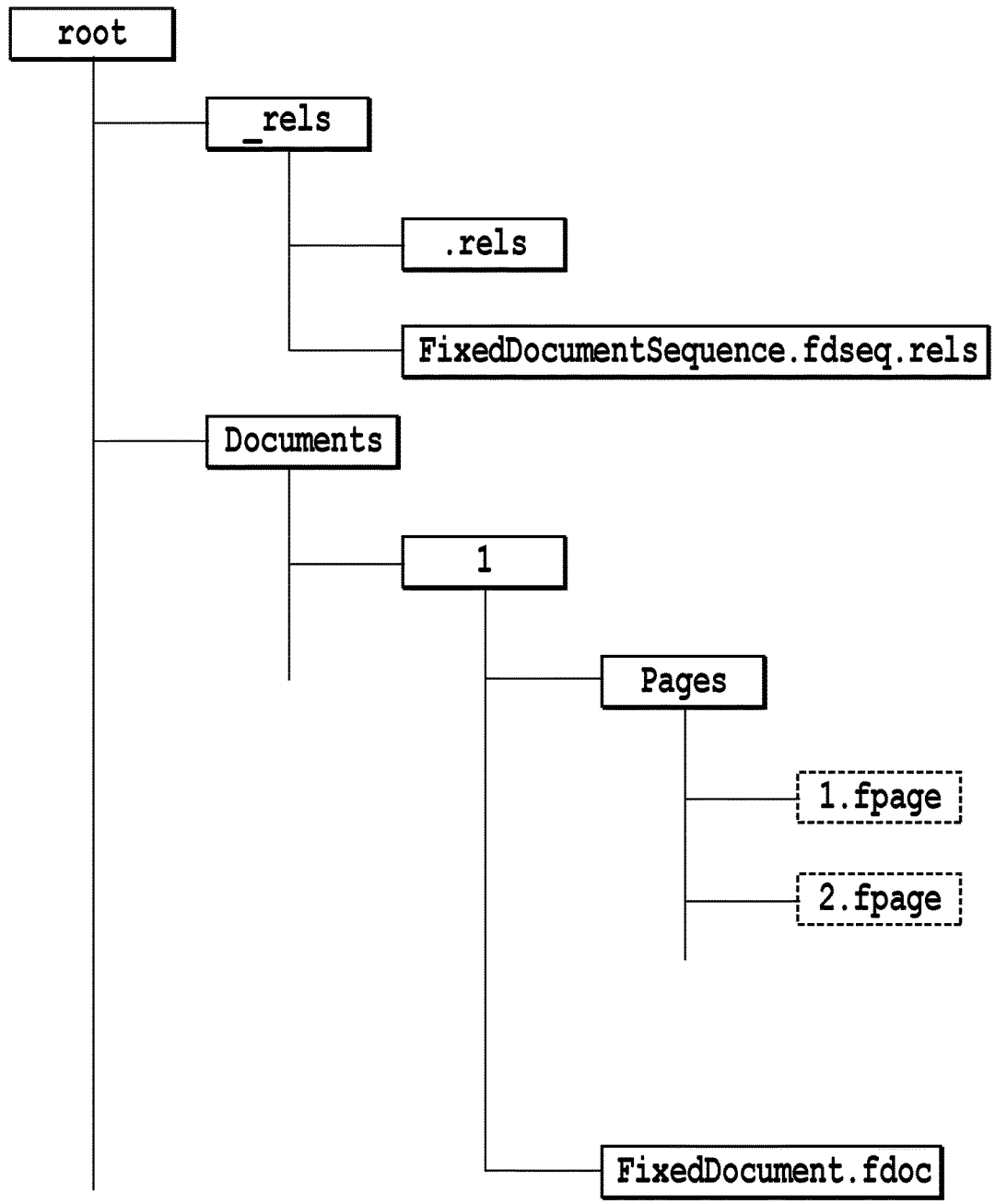
FIG. 10 is a diagram showing a data structure of XPS data.

At step 405, the drawing command is changed so that the solid image portion within the background-combined image OBJ that overlaps the single color graphics OBJ is printed as the graphics attribute. In the present embodiment, for the color in the pixel determined to have an overlap in the single color graphics overlap determination processing (S403), a graphics drawing command by a path point series is generated from the pixel portion of the same color within the background-combined image OBJ. FIG. 8A is an enlarged diagram of the background-combined image OBJ 510 and FIG. 8B is a diagram showing the portion corresponding to a solid image by graphics drawing by a path point series. Then, FIG. 9A shows a drawing command group before change of the printing-target page shown in FIG. 5A and FIG. 9B shows a drawing command group after change, respectively. Here, the drawing command group (in the case of the XPS format) that is sent from the application 300 is reviewed here. FIG. 10 is a diagram showing a data structure of XPS data that is input from the application compatible with the XPS. The XPS is an XML-based electronic document format and is the abbreviation of XML Paper Specification. In the XPS print path, a drawing command in the XPS format is generated by an application that handles the XPS and the drawing command is converted into print data by the printer driver for the XPS. In the XPS data, all the document information is described in the XML and a plurality of files classified according to description contents is put into one by ZIP compression. As shown in FIG. 10, the XPS data has a tree structure and in the first hierarchy under the root folder, a plurality of folders, such as "Metadata", "_rels", and "Documents", exists. Within the "Documents" folder of these folders, "1.fpage" and "2.fpage" are files for each page. FIG. 9A and FIG. 9B correspond to "1.fpage", which is one of these files. In FIG. 9A and FIG. 9B, a portion indicated by reference symbol 900 indicates the MXDC that has created the XPS file and the version name thereof. The MXDC is a module that converts drawing data in the GDI format into drawing data in the XPS format and is the abbreviation of Microsoft XPS Document Converter. The case of reference symbol 900 indicates that the XPS data is generated by the MXDC of version 0.3.7601.17514 made by Microsoft Corporation. In FIG. 9A and FIG. 9B, a portion indicated by reference symbol 901 is the drawing command corresponding to the background-combined image OBJ 510. In FIG. 9A and FIG. 9B, the drawing command for each OBJ (the single color graphics OBJs 501 and 502, the image OBJ 503 of a natural image) other than the background-combined image OBJ 510 is omitted. In FIG. 9B after change, a drawing command of a new path point series indicated by reference symbol 902 is added and by this drawing command, the graphics OBJ shown in FIG. 8B is overwritten to the background-combined image OBJ 510. That is, by drawing the graphics OBJ shown in FIG. 8B after the background-combined image OBJ 510, it is possible to give the graphics attribute to the solid image portion. In this manner, it is possible to prevent a difference in hue from arising at the time of printing, the difference resulting from a difference in attribute of the drawing command. Further, by registering the drawing information on the object to be drawn by the drawing command after change at step 406, it is made possible to find and eliminate a portion where a difference in hue may arise with no problem even in the case where another drawn image of the background-combined image further exists. The drawing command group shown in FIG. 9A and FIG. 9B is intermediate data, and therefore, information indicating its attribute ("attribute=" indicated by reference symbols 910 and 911) is included, which does not exist in the actual drawing command in the XPS format. The above is the contents of the processing in the color difference elimination processing unit 313 according to the present embodiment.

Figure 11:
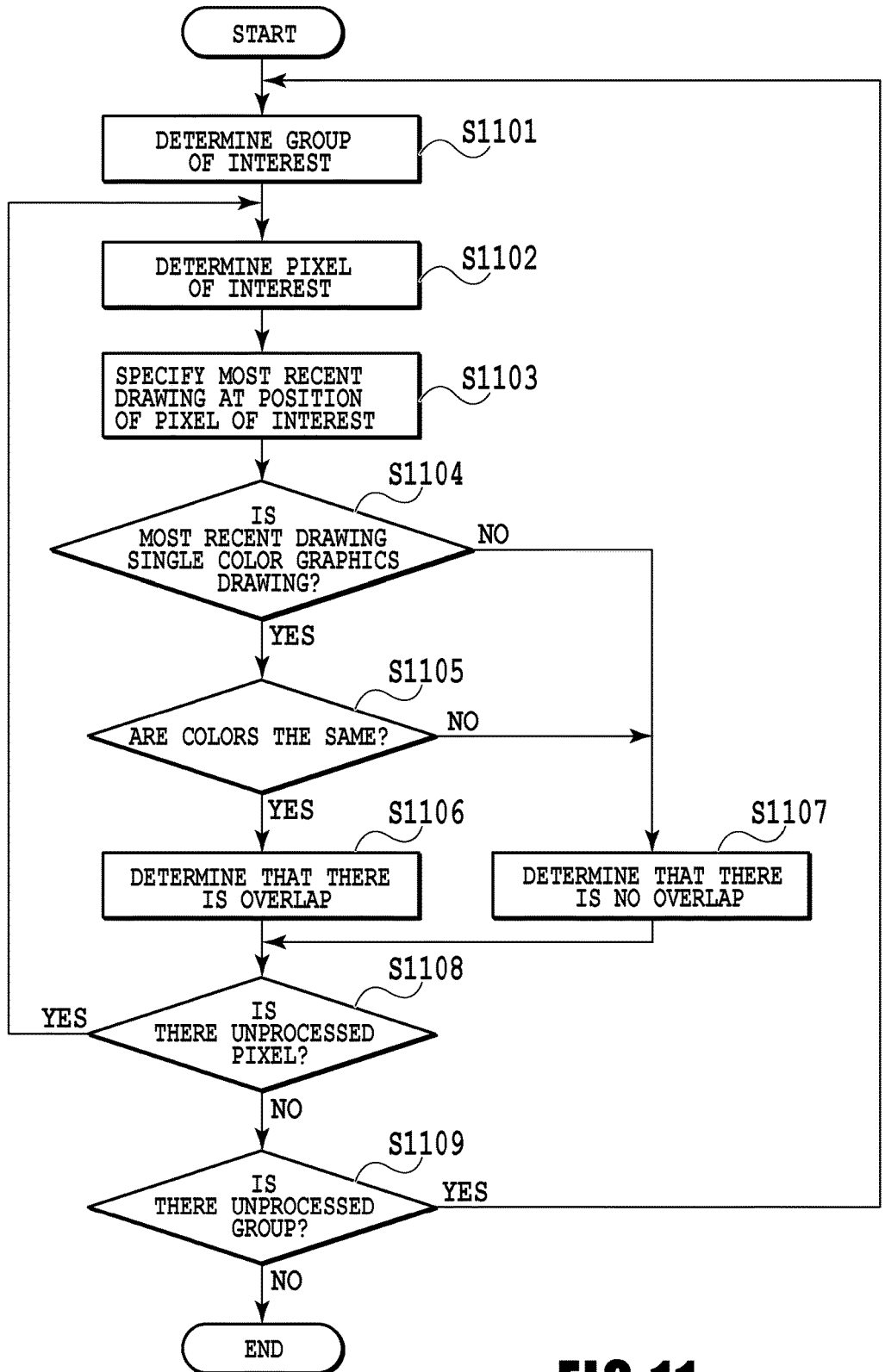
FIG. 11 is a flowchart showing details of single color graphics overlap determination processing.

Following the above, the single color graphics overlap determination processing at step 403 in FIG. 4 is explained. FIG. 11 is a flowchart showing details of the single color graphics overlap determination processing.

At step 1101, with reference to the table (FIG. 7B) storing information on a pixel series in which the same color continues for each group, a group on which attention is focused (hereinafter, group of interest) is determined from the groups within the table. Then, at step 1102, a pixel on which attention is focused (hereinafter, pixel of interest) is determined from the above-described pixel series in the group of interest.

At step 1103, the most recent drawing (the last drawing in the drawing order within the drawing information table in FIG. 6 described previously) at the position of the determined pixel of interest is specified.

At step 1104, whether the most recent drawing specified at step 1103 is the drawing of the single color graphics OBJ is determined. In this determination processing also, the drawing information table (FIG. 6) described previously is referred to. In the case where the results of the determination indicate that the most recent drawing is the drawing of the single color graphics OBJ, the processing advances to step 1105. On the other hand, in the case where the most recent drawing is not the drawing of the single color graphics OBJ, the processing advances to step 1107.

At step 1105, whether the color of the pixel of interest and the color of the single color graphics OBJ relating to the most recent drawing are the same is determined. In this determination processing also, the drawing information table (FIG. 6) described previously is referred to. In the case where the results of the determination indicate that the color of the pixel of interest and the color of the single color graphics OBJ relating to the most recent drawing are the same, the processing advances to step 1106. On the other hand, in the case where the color of the pixel of interest and the color of the single color graphics OBJ relating to the most recent drawing are different, the processing advances to step 1107.

At step 1106, it is determined that there is an overlap that may cause a difference in color to arise between the background-combined image OBJ and the single color graphics OBJ relating to the most recent drawing. Then, at step 1107, it is determined that there is no overlap that may cause a difference in color to arise between the background-combined image OBJ and the single color graphics OBJ relating to the most recent drawing.

At step 1108, whether there is an unprocessed pixel within the group of interest is determined. In the case where there is an unprocessed pixel, the processing returns to step 1102 and the next pixel is taken to be the pixel of interest and the processing is continued. On the other hand, in the case where the processing has been completed for all the pixels within the group of interest, the processing advances to step 1109.

At step 1109, whether there is an unprocessed group is determined. In the case where there is an unprocessed group, the processing returns to step 1101 and the next group is taken to be the group of interest and the processing is continued. On the other hand, in the case where the processing has been completed for all the groups, the present processing is terminated.

Modification Example

As describe previously, it is also possible to apply the method of the present embodiment to a configuration in which an input drawing command is converted into a PDL by performing processing to directly change the drawing command without the intervention of intermediate data. An example thereof is shown in FIG. 12A and FIG. 12B. FIG. 12A shows a drawing command group (XPS format) before change of the printing-target page shown in FIG. 5A and FIG. 12B shows a drawing command group (XPS format) after change. Because of being the drawing commands themselves input from an application compatible with the XPS, information indicating the attribute thereof does not exist (reference symbols 910 and 911 in FIG. 9A and FIG. 9B). FIG. 12A and FIG. 12B correspond to "1.fpage" as in FIG. 9A and FIG. 9B described previously. However, as in FIG. 9A and FIG. 9B, the drawing command for each OBJ (the single color graphics OBJs 501 and 502, the image OBJ 503 of a natural image) other than the background-combined image OBJ 510 is omitted. In FIG. 12A and FIG. 12B, a portion indicated by reference symbol 1201 is the image drawing command corresponding to the background-combined image OBJ 510. In FIG. 12B after change, a drawing command of a new path point series indicated by reference symbol 1202 is added and by this drawing command, the drawn image of the graphics OBJ shown in FIG. 8B is overwritten to the background-combined image OBJ 510.

According to the present embodiment, in the case where it is determined that the background-combined image OBJ 510 and the single color graphics OBJ overlap and there is a possibility that a difference in hue arises, a drawing command to overwrite the overlap portion within the object of the background-combined image by a graphics OBJ by the path point series is added. By performing printing processing in accordance with the print job such as this, it is possible to prevent a difference in hue from arising in the printing results.

Second Embodiment

In the first embodiment, in the case where it is determined that there is a possibility that a difference in hue arises, the solid image portion where the background-combined image OBJ and the single color graphics OBJ overlap is overwritten by a graphics OBJ by a path point series. Next, an aspect is explained as a second embodiment in which a difference in hue due to a difference in attribute is eliminated by creating a mask image (attribute bitmap image). Explanation of the portions in common to those of the first embodiment is omitted or simplified and in the following, drawing command change contents, which are a different point, are explained mainly.

Figure 13A:
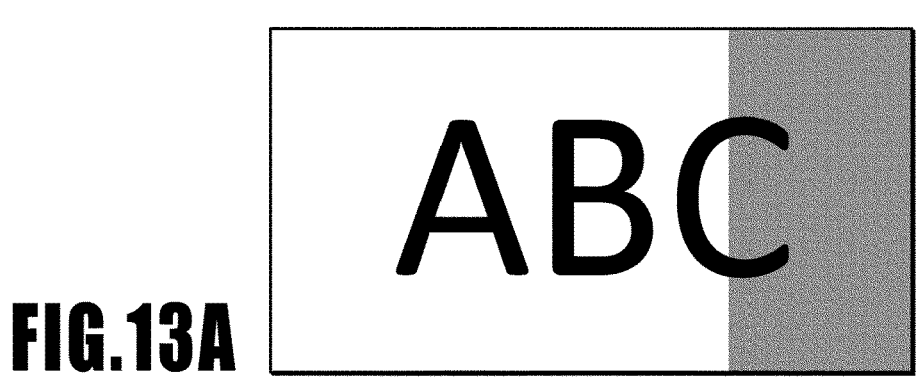
FIG. 13A is an enlarged diagram of the background-combined image OBJ and FIG. 13B is a diagram showing a mask image corresponding to a solid image portion.
Figure 13B:
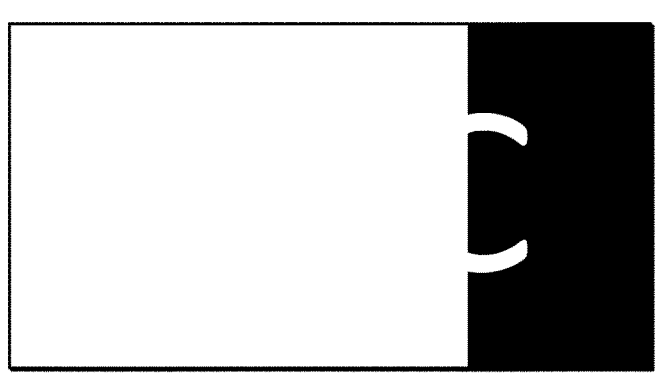

In the present embodiment, at step 405 in the flow in FIG. 4 described previously, a mask image corresponding to the solid image portion within the background-combined image OBJ is created. FIG. 13A is an enlarged diagram of the background-combined image OBJ 510 the same as that in FIG. 8A and FIG. 13B shows a mask image corresponding to the solid image portion. A mask image is created by setting "1 (black)" to only the pixels of the same color within the background-combined image OBJ and setting "0 (white)" to all the other pixels for the color of a pixel for which it is determined that there is an overlap in the single color graphics overlap determination processing (S403). In the mask image, black and white may be exchanged. In this example, the overlap color is only one color, but in the case where there is a plurality of overlap colors, it is sufficient to create a mask image in which the portion of each of the overlap colors is set to "1 (black)". Specifically, it is sufficient to create a mask image by combining the mask image for a first color created previously and the mask image created for a second color. Then, based on the mask image created as described above, a drawing command to perform drawing by removing the mask portion is issued. Then, by attaching the graphics attribute to the drawing command, the mask image portion is drawn as the graphics attribute, and therefore, it is possible to eliminate a difference in hue.

According to the present embodiment, a mask image (attribute bitmap image) corresponding to the overlap portion within the object of the background-combined image is created and a drawing command to remove the mask portion is added. By performing printing processing in accordance with the print job such as this, it is possible to prevent a difference in hue from arising in the printing results as in the first embodiment.

Third Embodiment

In the first and second embodiments, by changing the object attribute of the portion (solid image portion) where a difference in hue may arise, the difference in hue is prevented from arising. Next, an aspect is explained as a third embodiment in which in the case where there is a possibility that a difference in hue arises, the attribute of the background-combined image OBJ itself is changed from image into graphics. Explanation of the portions in common to those of the first embodiment is omitted or simplified and in the following, color difference elimination processing, which is a different point, is explained mainly.

Figure 14:
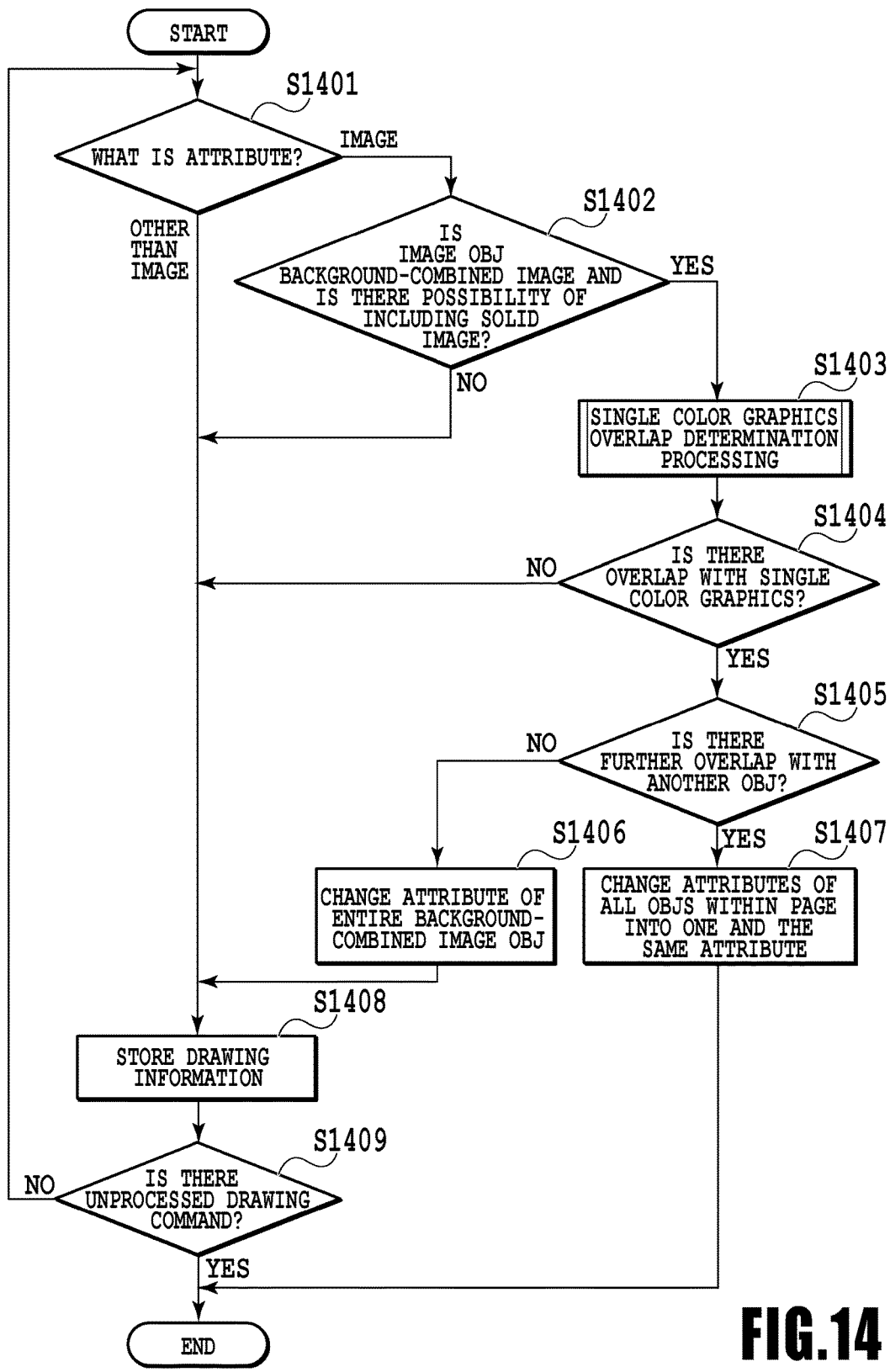
FIG. 14 is a flowchart showing a flow of color difference elimination processing according to a third embodiment.

FIG. 14 is a flowchart showing a flow of color difference elimination processing according to the present embodiment. Step 1401 to step 1404 correspond to step 401 to step 404 in the flow in FIG. 4 of the first embodiment. First, attribute determination processing is performed for an input drawing command (S1401) and in the case of the image attribute, whether an image OBJ corresponding to the image drawing command is a background-combined image OBJ having the possibility of including a solid image is determined (S1402). Then, in the case of the background-combined image OBJ having the possibility of including a solid image, single color graphics overlap determination processing is performed (S1403) and in the case where there is an overlap with the single color graphics OBJ, the processing advances to step 1405 (Yes at S1404).

At step 1405, whether there is further an overlap with another object is determined. Specifically, in an area other than the area in which an overlap with the single color graphics OBJ exists in the area of the background-combined image OBJ, whether there is an overlap with another OBJ image (e.g., an image OBJ of a natural image or the like) other than the single color graphics OBJ is determined. In the case where there is no overlap with another OBJ, the processing advances to step 1406 and the attribute of the background-combined image OBJ is changed from image into graphics. FIG. 15A and FIG. 15B are diagrams showing an example in which information indicating the attribute of the drawing command (intermediate data) relating to the background-combined image OBJ has been changed from image into graphics. However, as in FIG. 9A, FIG. 9B, FIG. 12A, and FIG. 12B, the drawing command for each OBJ (the single color graphics OBJs 501 and 502, the image OBJ 503 of a natural image) other than the background-combined image OBJ 510 is omitted. In a drawing command group before change shown in FIG. 15A, the attribute information indicated by reference symbol 1501 is "attribute=Image", but in a drawing command group after change shown in FIG. 15B, the attribute information indicated by reference symbol 1502 is "attribute=Graphics".

On the other hand, in the case where it is determined that there is an overlap with another OBJ by the determination at step 1405, the processing advances to step 1407 and the attributes of all the OBJs within the same page are changed into one and the same attribute. FIG. 5C shows an example in which an image OBJ 503' of a natural image also overlaps the background-combined image OBJ 510, in addition to the single color graphics OBJ 502. In the case such as this where the image OBJ of a natural image is also combined and overlaps, on a condition that the entire background-combined image OBJ is changed into the graphics attribute, the image OBJ of a natural image is divided into the area in which the attribute is image and the area in which the attribute is graphics. In this case, there is a possibility that an unnatural difference in hue arises in the natural image. Consequently, in order to avoid such a situation from occurring, in the case where an OBJ other than the single color graphics OBJ overlaps the background-combined image OBJ, at step 1407, the attributes of all the objects within the page including the background-combined image OBJ are changed into one kind of attribute (e.g., graphics), and thereby, the attributes are changed into one and the same attribute. Here, the contents of one and the same attribute into which all the attributes are changed may be other attributes, such as image and text. Further, it may also be possible to determine one and the same attribute into which all the attributes are changed based on the attribute of the OBJs whose number is the largest of all the OBJs, or to determine based on the area of drawing that occupies within the page. In the case where the attributes of all the objects within a page are changed into one and the same attribute as described above, it is no longer necessary to store drawing information on the OBJs within the subsequent pages, and therefore, the present processing is terminated. That is, the processing moves to the processing of the next page.

Step 1408 and step 1409 correspond to step 406 and step 407 in the flow in FIG. 4 of the first embodiment. That is, at step 1408, drawing information on a processing-target drawing command is stored in a table and at step 1409, whether there is an unprocessed drawing command is determined. Then, in the case where there is an unprocessed drawing command, the processing returns to step 1401 and the processing of the next drawing command is continued in accordance with the drawing order.

According to the present embodiment, in the case where it is determined that the background-combined image OBJ and the single color graphics OBJ overlap and there is a possibility that a difference in hue arises, whether there is an overlap with another OBJ of a natural image or the like is further determined. Then, in the case where there is no overlap with another OBJ, the attribute of the background-combined image OBJ is changed into graphics and in the case where there is an overlap with another OBJ, the attributes of all the OBJs within the page are changed into one and the same attribute. Due to this, the same effect as that in the first and second embodiments is obtained. Further, unlike the first and second embodiments, there is no addition of a drawing command, and therefore, it is also possible to reduce the processing time and cost.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment (s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, even in the case where combination of drawing commands (in particular, generation of a background-combined image) is performed on the application side, it is possible to generate a print job that does not cause a difference in hue to arise, which is caused by image processing accompanying printing processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-121819 filed Jun. 20, 2016, which is hereby incorporated by reference wherein in its entirety.

What is claimed is:

1. An information processing apparatus comprising:
a computer-readable storage device storing a software printer driver that generates a print job for causing a printing apparatus to perform printing; and
a processor configured to execute the software printer driver to:
change a drawing command input from an application so as to prevent a difference in hue from arising in printing at an overlap portion within a background-combined image object, in which a text object and a background thereof were combined by the application, in a case where an object relating to the drawing command is the background-combined image object, and the background-combined image object overlaps a graphics object for which a single color is specified; and
generate the print job by converting the changed drawing command into a PDL,
wherein the processor further executes the software printer driver to determine, in a case where following conditions 1) to 3) are satisfied, that the object relating to the drawing command is the background-combined image object and overlaps the graphics object for which the single color is specified:
1) the drawing command is a drawing command to specify drawing of an image object,
2) a portion where part of a graphics object that is one before the image object in drawing order and for which a single color is specified has changed into an image is included within the image object, and
3) the portion is the same color as that of the graphics object for which a single color is specified and overlaps the graphics object.

2. The information processing apparatus according to claim 1, wherein
the processor further executes the software printer driver to determine, in a case where in pixels located at the boundary position with the outside of the image object, pixels of a color other than white continue in a predetermined number or more, that a portion where part of a graphics object that is immediately before the image object in drawing order and for which a single color is specified has changed into an image is included within the image object.

3. The information processing apparatus according to claim 1, wherein
the processor further executes the software printer driver to change the drawing command so that at least the overlap portion is printed as a graphics attribute.

4. The information processing apparatus according to claim 3, wherein
the change of the drawing command is addition of a drawing command to overwrite the overlap portion by the same color as that of a graphics object by a path point series.

5. The information processing apparatus according to claim 3, wherein
the change of the drawing command is creation of a mask image corresponding to the overlap portion and addition of a drawing command to remove a mask portion in the mask image.

6. The information processing apparatus according to claim 5, wherein
in a case where there is a plurality of overlap colors, the mask image is created by performing OR combination of a mask image created for each portion of overlap colors.

7. The information processing apparatus according to claim 3, wherein
the processor further executes the software printer driver to determine, in a case where it is determined that the object relating to the drawing command is the background-combined image object and overlaps a graphics object for which a single color is specified, whether the background-combined image object overlaps another object, and
in a case where the background-combined image object does not overlap another object, the processor changes the drawing command so that the background-combined image object is printed as a graphics attribute, and in a case where the background-combined image object overlaps another object, the processor changes the drawing command so that all the objects included in the same page are printed as the same attribute.

8. The information processing apparatus according to claim 7, wherein contents of the same attribute are one of graphics, image, and text.

9. The information processing apparatus according to claim 8, wherein the processor further executes the software printer driver to determine, in a case where the background-combined image object overlaps another object, which attribute the drawing command is changed into so that all the objects included in the same page are printed as the same attribute based on the attribute of an object whose number is the largest of objects included within the same page, or in accordance with an area of drawing that occupies within the same page.

10. A method of generating a print job for causing a printing apparatus to perform printing, the method comprising:

performing, in a case where an object relating to a drawing command input from an application is a background-combined image object in which a text object and a background thereof were combined by the application, and the background-combined image object overlaps a graphics object for which a single color is specified, color difference elimination processing to change the drawing command so as to prevent a difference in hue from arising in printing at the overlap portion within the background-combined image object;

generating the print job by converting the changed drawing command into a PDL; and determining that the object relating to the drawing command is the background-combined image object and overlaps the graphics object for which the single color is specified in a case where following conditions 1) to 3) are satisfied:

1) the drawing command is a drawing command to specify drawing of an image object,
2) a portion where part of a graphics object that is one before the image object in drawing order and for which a single color is specified has changed into an image is included within the image object, and
3) the portion is the same color as that of the graphics object for which a single color is specified and overlaps the graphics object.

11. A non-transitory computer readable storage medium storing a program for causing a computer to perform a method of generating a print job for causing a printing apparatus to perform printing, the method comprising:

performing, in a case where an object relating to a drawing command input from an application is a background-combined image object in which a text object and a background thereof were combined by the application, and the background-combined image object overlaps a graphics object for which a single color is specified, color difference elimination processing to change the drawing command so as to prevent a difference in hue from arising in printing at the overlap portion within the background-combined image object;

generating the print job by converting the changed drawing command into a PDL; and determining that the object relating to the drawing command is the background-combined image object and overlaps the graphics object for which the single color is specified in a case where following conditions 1) to 3) are satisfied:

1) the drawing command is a drawing command to specify drawing of an image object,
2) a portion where part of a graphics object that is one before the image object in drawing order and for which a single color is specified has changed into an image is included within the image object, and
3) the portion is the same color as that of the graphics object for which a single color is specified and overlaps the graphics object.

\* \* \* \* \*